(12) United States Patent
Straus et al.

(10) Patent No.: US 6,887,550 B2
(45) Date of Patent: May 3, 2005

(54) REMOVABLE DEFINED FLANGE FOR IN-MOLD COATING CONTAINMENT

(75) Inventors: Elliott J. Straus, Akron, OH (US); John A. Thompson, Wooster, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 200 days.

(21) Appl. No.: 10/136,877

(22) Filed: May 1, 2002

(65) Prior Publication Data

US 2003/0099809 A1 May 29, 2003

Related U.S. Application Data

(63) Continuation-in-part of application No. 10/045,481, filed on Oct. 22, 2001.

(51) Int. Cl.⁷ ............................................. B32B 3/02
(52) U.S. Cl. ..................... 428/81; 264/139; 264/176.1; 264/219; 264/255
(58) Field of Search .................. 428/81; 264/176.1, 264/219, 139, 255

(56) References Cited

U.S. PATENT DOCUMENTS

| | | |
|---|---|---|
| 2,337,550 A | 12/1943 | Crosby |
| 4,076,788 A | 2/1978 | Ditto |
| 4,081,578 A | 3/1978 | van Essen et al. |
| 4,115,506 A | 9/1978 | Shima |
| 4,189,517 A | 2/1980 | Shanoski et al. |
| 4,222,929 A | 9/1980 | Shanoski et al. |
| 4,316,869 A | 2/1982 | Van Gasse |
| 4,331,735 A | 5/1982 | Shanoski |
| 4,350,739 A | 9/1982 | Mohiuddin |
| 4,366,109 A | 12/1982 | Svoboda |
| 4,389,358 A | 6/1983 | Hendry |
| 4,414,173 A | 11/1983 | Cobbledick et al. |
| 4,515,710 A | 5/1985 | Cobbledick |
| 4,668,460 A | 5/1987 | Ongena |
| 4,711,602 A | 12/1987 | Baker |
| 4,783,298 A | 11/1988 | Oda |
| 4,798,697 A | 1/1989 | Nohara et al. |
| 4,840,553 A | 6/1989 | Arai |
| 4,921,669 A | 5/1990 | Vetter et al. |
| 4,931,234 A | 6/1990 | Schad et al. |
| 4,950,154 A | 8/1990 | Moberg |
| 4,963,312 A | 10/1990 | Müller |
| 5,053,177 A | 10/1991 | Vetter et al. |
| 5,084,353 A | 1/1992 | Cobbledick et al. |
| 5,132,052 A | 7/1992 | Cobbledick et al. |
| 5,359,002 A | 10/1994 | Cobbledick et al. |
| 5,391,399 A | 2/1995 | Cobbledick et al. |
| 5,496,509 A | 3/1996 | Yamamoto et al. |
| 5,562,979 A | 10/1996 | Easterlow et al. |
| 5,614,581 A | 3/1997 | Cobbledick et al. |
| 5,632,949 A | 5/1997 | Fisher et al. |
| 5,639,403 A | 6/1997 | Ida et al. |
| 5,658,672 A | 8/1997 | Lenke et al. |
| 5,736,090 A | 4/1998 | Yamamoto et al. |
| 5,777,053 A | 7/1998 | McBain et al. |
| 5,849,168 A | 12/1998 | Lutz |
| 5,882,559 A | 3/1999 | Eckardt et al. |
| 5,902,534 A | 5/1999 | Fujishiro et al. |
| 5,906,788 A | 5/1999 | Boeckler |
| 5,925,386 A | 7/1999 | Moberg |
| 6,174,158 B1 | 1/2001 | Seres, Jr. et al. |
| 6,180,043 B1 | 1/2001 | Yonemochi et al. |
| 6,261,075 B1 | 7/2001 | Lee et al. |
| 6,287,488 B1 | 9/2001 | Dougherty et al. |
| 6,328,920 B1 | 12/2001 | Uchiyama et al. |
| 6,409,955 B1 | 6/2002 | Schmitt et al. |
| 6,558,599 B1 | 5/2003 | Bethune |
| 2002/0039656 A1 | 4/2002 | McBain et al. |
| 2002/0172834 A1 * | 11/2002 | Rivett et al. ................. 428/515 |

FOREIGN PATENT DOCUMENTS

| | | |
|---|---|---|
| DE | 1 949 756 | 4/1971 |
| DE | 25 07 727 | 9/1976 |
| DE | 39 38 891 A1 | 5/1990 |
| DE | 38 04 619 A1 | 8/1999 |
| EP | 0 472 312 A2 | 2/1992 |
| EP | 0 625 418 A1 | 11/1994 |

(Continued)

OTHER PUBLICATIONS

Patent Abstract of Japan, vol. 1997, No. 06, Jun. 30, 1997 & JP 09 052262.
Patent Abstract of Japan, vol. 018, No. 094, Feb. 16, 1994 & JP 05 301251.
Long Fiber Reinforced Thermoplastics, *Injection Molding Guide*, Celstran, 1999, pp. 1–27.
U.S. patent application Ser. No. 60/198,691, Brett, filed Apr. 20, 2001.
The Sabreen Group, Inc.'s "Preparing Plastics for Painting" article.
Chlorocarbons and Chlorohydrocarbons–$C_2$ to Combustion Technology, Kirk–Othmer *Encyclopedia of Chemical Technology*, Fourth Edition, vol. 6, (1993), pp. 676–690.
GE Plastics Processing Guide, *GE Engineering Thermoplastics Injection Molding Processing Guide*, General Electric, 1998, pp. i–iv.

(Continued)

*Primary Examiner*—Terressa Boykin
(74) *Attorney, Agent, or Firm*—Fay, Sharpe, Fagan, Minnich & McKee, LLP; David G. Burleson (57) ABSTRACT

Molded articles or substrates having an in-mold coating thereon are disclosed. The in-mold coated substrates are produced by a method wherein the flow of the in-mold composition onto the substrate can be selectively controlled. The molded articles can be preferentially coated in desired or predetermined areas with in-mold coating compositions by controlling the thickness or depth of various sections of the substrate. A molded article or substrate is provided with a removable in-mold coating containment flange which extends completely around the perimeter of a surface to be coated in order to substantially contain the in-mold coating within the mold cavity and on the desired area of a part before the coating has been cured.

32 Claims, 7 Drawing Sheets

FOREIGN PATENT DOCUMENTS

| | | |
|---|---|---|
| EP | 0 661 146 B1 | 7/1995 |
| EP | 0 733 668 A | 9/1996 |
| EP | 0 894 603 A1 | 7/1998 |
| EP | 0 919 350 A2 | 11/1998 |
| EP | 0 953 419 | 4/1999 |
| EP | 0 934 808 A | 8/1999 |
| EP | 1 207 031 A | 5/2002 |
| FR | 2 395 135 | 1/1979 |
| FR | 2781715 | 7/1998 |
| JP | 60-31931 | 2/1985 |
| JP | 63-021110 | 1/1988 |
| JP | 01-110921 | 4/1989 |
| JP | 05 301251 A | 1/1993 |
| JP | 06-328504 | 11/1994 |
| JP | 07-32416 | 2/1995 |
| JP | 08-127038 | 5/1996 |
| JP | 09-52262 | 2/1997 |
| JP | 09-039024 | 2/1997 |
| JP | 2001-96573 | 4/2001 |
| JP | 2002-240087 | 8/2002 |
| WO | WO 95 13177 | 5/1995 |
| WO | WO 01/07230 A1 | 2/2001 |
| WO | PCT/CA01/00534 | 4/2001 |
| WO | WO 01 81065 | 11/2001 |
| WO | WO 02/04187 A2 | 1/2002 |
| WO | WO 03 035354 A | 5/2003 |

OTHER PUBLICATIONS

GE Injection Molding Mold Design, *GE Engineering Thermoplastics Injection Molding Processing Guide*, General Electric, 1998, pp. 1–1—1–24.

GE Injection Molding Processing, *GE Engineering Thermoplastics Injection Molding Processing Guide*, General Electric, 1998, pp. 2–1—2–12.

GE Injection Molding Troubleshooting Guide, *GE Engineering Thermoplastics Injection Molding Processing Guide*, General Electric, 1998, pp. 3–1—3–7.

Ansgar Jaeger, Schwaig, *Neues vom Mehrkomponenten–Spritzgiessen*, Spritzgiessen/KU XP–000958432, Jahrg. 89 (1999) pp. 85–89.

\* cited by examiner

REMOVABLE DEFINED FLANGE FOR IN-MOLD COATING CONTAINMENT

CROSS REFERENCE

This application is a continuation-in-part of prior application Ser. No. 10/045,481, filed Oct. 22, 2001, entitled "Selectively Controlling In-Mold Coating Flow."

FIELD OF THE INVENTION

The present invention relates to an in-mold coated article or substrate having an easily removable defined flash edge or flange for containment of in-mold coating. Without a flash edge component, uncured in-mold coating is often lost from the intended surface of a substrate to be coated. The substrate provided with a flexible flash edge or containment flange serves as a barrier that prevents uncured or fluid in-mold coating from contaminating both mold surfaces and substrate surfaces desired to be maintained free of coating. After the molding and coating has been accomplished, the flash edge can be easily removed as by hand with little effort by flexing, leaving a coated article of predetermined dimensions.

The present invention relates to a method for coating a molded article or substrate with an in-mold composition, wherein the flow and thus the thickness of the in-mold composition onto the substrate can be selectively controlled. Importantly, desired areas of molded articles can be preferentially coated with in-mold coating compositions by controlling the thickness or depth of various sections of the substrate. Advantageously, the method of the present invention can be utilized to mold articles of relatively complex shape or design which have an in-mold coating thereon having a uniform or desired appearance.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping off of the desired surface and out of the mold cavity. The in-mold coating containment flange extends substantially completely around the perimeter of a molded substrate surface where the in-mold coating has been applied thereto.

BACKGROUND OF THE INVENTION

Molded thermoplastic and thermoset articles, such as those made from polyolefins, polycarbonate, polyester, polyethylene, polypropylene, polystyrene and polyurethanes, are utilized in numerous applications including those for the automotive, marine, recreation, construction, office products, and outdoor equipment industries. For example, automotive industry applications include body panels, wheel covers, bumpers, head and tail lamps, fenders, hoods, and dashboards.

Use of the molded articles is not without problem, as the surface quality may not meet required standards, such as durability, chemical resistance, and weather resistance. In many instances, the molded thermoplastic articles may need to be coated to satisfy the above-noted requirements or to facilitate paint adhesion.

Countless methods have been developed to apply various coatings to the molded articles to improve the surface characteristics thereof.

Previously, molded work pieces were formed in a mold, the molded product removed, and a coating was then applied on the surface of the molded work piece by a coating process, such as a surface treatment, primer coating, top coating, painting, etc. Hence the foregoing methods required at least one additional step to achieve a finished surface on a work piece, i.e. treating the surface of the pre-formed work piece prior to applying a paint or coating. These methods required additional steps and increased costs of preparing the molded work piece surface.

It became desirable, therefore, to have a method by which a coating could be applied to a work piece in the mold, resulting in a coated work piece the surface of which would be finished and suitable for use "as is" in an end use application, or which would require less or no surface preparation treatment than heretofore utilized.

The application of in-mold coatings (IMC) to thermoplastic or thermoset materials to provide generally smooth surfaces, improve durability and other surface properties, and to reduce or eliminate substrate porosity is known. A number of in-mold coating methods have been employed for applying coatings, in compression molding methods or injection molding methods employing molding materials of thermosetting resins, such as SMC (sheet molding compound) and BMC (bulk molding compound) (e.g., U.S. Pat. Nos. 4,076,788; 4,081,578; 4,331,735; 4,366,109; and 4,668,460).

Heretofore, the in-mold coatings which have been applied to molded articles typically covered the entire surface of the article. The coverage of the coating was controlled by only the amount of coating applied, such as in the case of an undershot, or the physical boundaries of the mold cavity.

International Application Number PCT/CA01/00534 relates to a method of molding a panel or product having an in-mold coating applied thereto. The molded part has a flange which extends about the periphery of the molded part. The flange includes a rigid notch having a depth of at least 1 mm, and an outer raised portion or racetrack outside of the notch which is 3 mm thick. Due to the thickness of the notch, the flange is stiff, rigid and not removable by hand. Accordingly, the part includes a coated surface on at least a partially uncoated outer surface which is unsightly.

SUMMARY OF THE INVENTION

A substrate is provided with an easily removable flash edge or flange. The flash edge prevents in-mold coating loss from the intended substrate surface. The flash edge thus offers cost savings by conserving the amount of in-mold coating utilized in a molding operation. Contamination of uncoated part surfaces as well as mold surfaces is also prevented. The flash edge can be easily removed by hand or simple tools after the coating process, leaving a coated substrate having desired dimensions.

An improved method for applying in-mold coatings has been developed, whereby molded articles can be preferentially coated in desired area, and depth of coating can be regulated by selectively controlling the thickness of sections of the article.

The present invention relates to a method for preferentially in-mold coating a molded article or substrate in at least one predetermined area based upon the thickness or depth of the article. A first composition is molded into an article or substrate in a mold, preferably by injection molding techniques known in the art. A second composition is applied to the substrate in-mold, wherein the second composition is directed to at least one predetermined area of the substrate based on the compressibility thereof.

Molded substrates often have complex designs or configurations and heretofore, it has been difficult or impossible to produce an in-mold coated article which has been properly or fully coated to desired specifications.

Advantageously, it has been found that the flow of in-mold coating over an article can be effectively controlled, whereby the coating can be channeled or routed so that the coating on the substrate surface conforms to design specifications. The in-mold coatings are preferably channeled by providing the substrate with areas of varying thickness or depth below the surface to be coated. It has been found that substrate areas of greater depth promote in-mold coating flow relative to less thick areas. The present invention also teaches a method for controlling the thickness of an in-mold coating on a substrate.

The present invention provides a method for producing molded articles with coatings in predetermined areas which are suitable for use as-is in an end use application or which require minimal or no surface post-treatment.

A further object of the present invention is to eliminate the need of applying additional paint or other surface treatment coatings to a surface of a pre-formed work piece.

Yet another object of the present invention is to provide a work piece having an appearance in-mold coating thereon, which has paint-like properties, such as high gloss, hardness, good adhesion and good weatherability.

A further object of the present invention is to provide a work piece having an in-mold coating thereon, which has good flow and coverage during molding, good adhesion, uniform color, durability, weather resistance, good surface qualities, and good paintability.

In one embodiment of the present invention, a molded article is provided with an area of increased relative thickness at the location of in-mold coating injection in order to encourage or promote in-mold coating flow.

In yet another embodiment of the present invention, a molded article or substrate is provided with at least one runner section or preferred flow channel to promote in-mold coating flow over the surface of a substrate.

Still another embodiment of the present invention involves providing a molded article or substrate with an in-mold coating containment flange which acts as a barrier and prevents the in-mold coating from leaking or seeping out of the mold cavity. The in-mold coating containment flange extends substantially completely around the perimeter of a coated molded substrate surface.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The present invention relates to producing a molded article or substrate having a coating bonded thereto. The coating is present on the surface of the substrate in a predetermined area or areas. In-mold coating thickness can also be controlled by the method of the present invention.

The method of the present invention provides a process for controlling the flow of a liquid in-mold coating so that it can be channeled or routed on a substrate to result in a coating having a uniform thickness or appearance on a large or complex shape. The in-mold coating can be channeled to coat an entire surface of a substrate or only selected areas thereof.

The method of the present invention can generally be practiced on any molding apparatus such as injection molders capable of producing a molded article or substrate of a first composition and then coating the article or substrate with a second composition, i.e. an in-mold coating.

Figure 1:
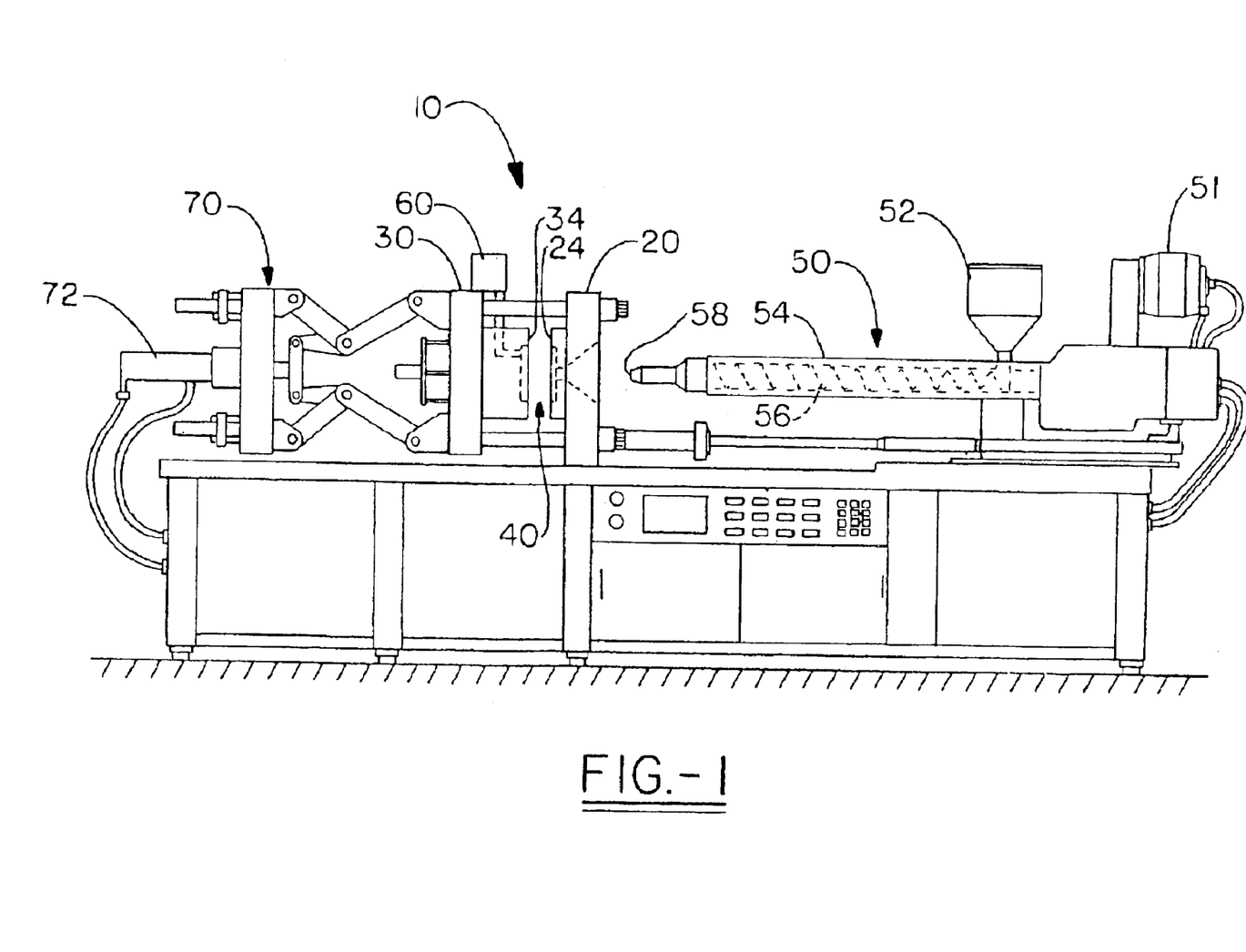
FIG. 1 is a side view of one embodiment of a molding apparatus suitable for practicing the method of the present invention.

Making reference now to the drawings wherein like numerals indicate like or corresponding parts throughout the several figures, a molding apparatus suitable for the practice of the present invention is shown in FIG. 1, and is generally designated 10.

Molding apparatus 10 includes a first mold half 20 which preferably remains in a stationary or fixed position relative to a second moveable mold half 30. FIG. 1 shows the mold halves in an open position. The first mold half and second mold half are adapted to mate, or abut, thereby forming a mold cavity 40 therebetween as shown in at least FIG. 2. The mold halves mate along surfaces 24 and 34 (FIG. 1) when the molding apparatus is in the closed position, forming a parting line 42 (FIG. 2) therebetween.

The moveable mold half 30 reciprocates generally along a horizontal axis relative to the first or fixed mold half 20 by action of a clamping mechanism 70 with a clamp actuator 72 such as through a hydraulic, mechanical, or electrical actuator as known in the art. The clamping pressure exerted by the clamping mechanism 70 should have an operating pressure in excess of the pressures generated or exerted by the first composition injector and the second composition injector. The pressure exerted by the clamping mechanism ranges generally from about 2,000 pounds per square inch (psi) (138 bar) to about 15,000 psi (1033 bar), desirably from about 4,000 pounds per square inch psi (276 bar) to about 12,000 psi (827 bar), and preferably from about 6,000 psi (413 bar) to about 10,000 psi (689 bar) of mold surface.

Figure 2:
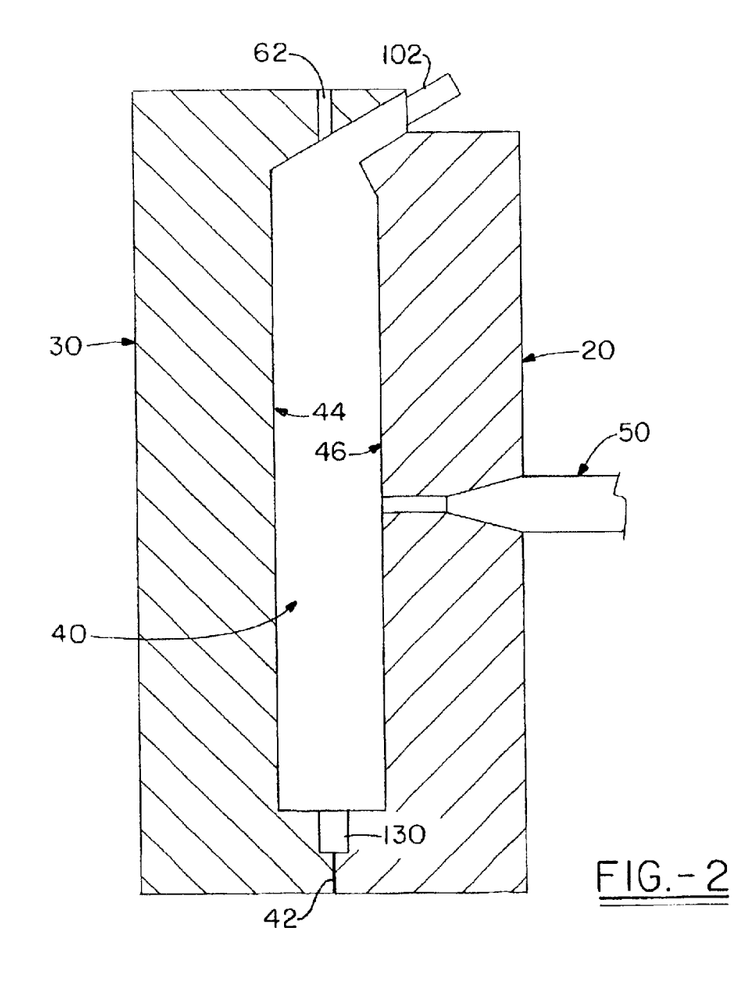
FIG. 2 is a cross section through a vertical elevation of a mold cavity.

In FIG. 2, the mold halves 20 and 30 are shown in a closed position, abutted or mated along parting line 42 at face surfaces 24 and 34. As illustrated, the mold cavity is shown in cross section. It is readily understood by those skilled in the art that the design of the cavity can vary greatly in size and shape according to the end product to be molded. The mold cavity generally has a first surface 44 on the first mold half, upon which a show surface of an article will be formed, and a corresponding back side or opposite second surface 46 on the second mold half. The mold cavity also contains separate orifices to allow the first and second composition injectors to inject their respective compositions thereinto. The location of the injectors and injection orifices thereof can vary from apparatus to apparatus, and part to part, and can be based on factors such as efficiency, functionality, or desire of the mold designer.

As shown in FIG. 1, the first composition injector 50 is a typical injection molding apparatus which is well know to those of ordinary skill in the art and is capable of injecting a thermoplastic or thermosetting composition, generally a resin or polymer, into the mold cavity. The first composition injector is shown in a "backed off" position, but it is readily understood that the same can be moved to a horizontal direction so that nozzle or resin outlet 58 mates with mold half 20 and can inject into mold cavity 40. For purposes of illustration only, the first composition injector in FIG. 1 is a reciprocating-screw machine wherein a first composition can be placed in hopper 52 and rotating screw 56 moves the composition through the heated extruder barrel 54, wherein the material is heated above its melting point. As the material collects in the end of the barrel, the screw acts as an injection ram and forces it through the nozzle 58 into the mold cavity 40. The nozzle generally has a non-return valve at the nozzle or screw tip to prevent the backflow of material into the screw.

The first composition injector is not meant to be limited to the embodiment shown in FIG. 1 but can be any apparatus capable of injecting a thermoplastic composition into the mold cavity. Suitable injection molding machines are available from Cincinnati-Milacron, Battenfeld, Engel, Husky, Boy and others.

The present invention for selectively controlling the flow of in-mold coatings can be practiced on generally any thermoplastic substrates which can be injection molded. Suitable thermoplastic substrates, include but are not limited to polyethylene terephthalate (PET), nylon, acrylonitrile butadiene styrene (ABS), polystyrene, fiber reinforced plastics, glass filled polymers, polyacrylate, polyester, polyphenylene sulfide, polysulfone, polyurethane, styrene-acrylonitrile, polycarbonate, acrylic, acetal, polyolefins such as polyethylene, polypropylene, and polyvinyl chloride (PVC). The foregoing list is not meant to be exhaustive but only illustrative of the various materials useful in the practice of the invention.

Figure 3:
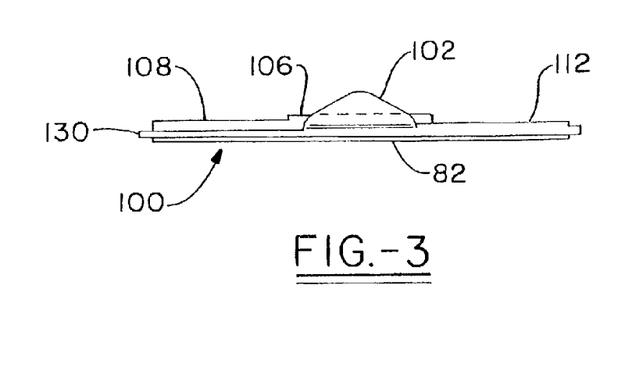
FIG. 3 is a top view of a molded substrate prior to being coated with an in-mold coating. The substrate is shown having an area of increased thickness in order to promote and/or channel in-mold coating flow.

It has been found that a surface of the substrate can be selectively coated with in-mold coatings in predetermined areas by controlling or modifying the thickness or depth of the substrate. When utilized in the present invention, thickness or depth is defined as a distance, girth, or dimension from one surface to the opposite surface of the substrate. The method of the present invention is generally concerned with the depth between two surfaces, the first being a surface to which an in-mold mold coating is selectively directed or applied, commonly referred to as a show or appearance surface, and the back surface that is substantially the opposite side of the substrate. The in-mold coating may but does not necessarily cover the entire show surface. For example, in FIG. 3 thickness refers to the distance from show surface 82 of a substrate to the backside or opposite surface 84. As shown in FIG. 3, the thickness between the show surface and back side of the substrate can vary.

Each substrate of the present invention inherently has a compressibility factor or percentage, wherein at a given temperature each specific substrate is compressible to a certain calculable percentage. Therefore, even though a molded article or substrate has a single compressibility ratio, a first area of a substrate which is thicker relative to a second area of the substrate will be able to compress a greater thickness or distance than the second substrate. For example, substrate "A" has a compressibility ratio of 20 percent at a certain temperature. Therefore, a portion of substrate "A" which has a thickness of 2.0 cm can compress 0.4 cm, whereas a portion of the substrate which has a thickness of 1.0 cm can only compress 0.2 cm at the given temperature.

The above described substrate compressibility can be utilized to selectively coat predetermined areas of a substrate. Substrate compressibility can also be utilized to effectively direct the flow of an in-mold coating into certain areas or pathways of a substrate.

Figure 4:
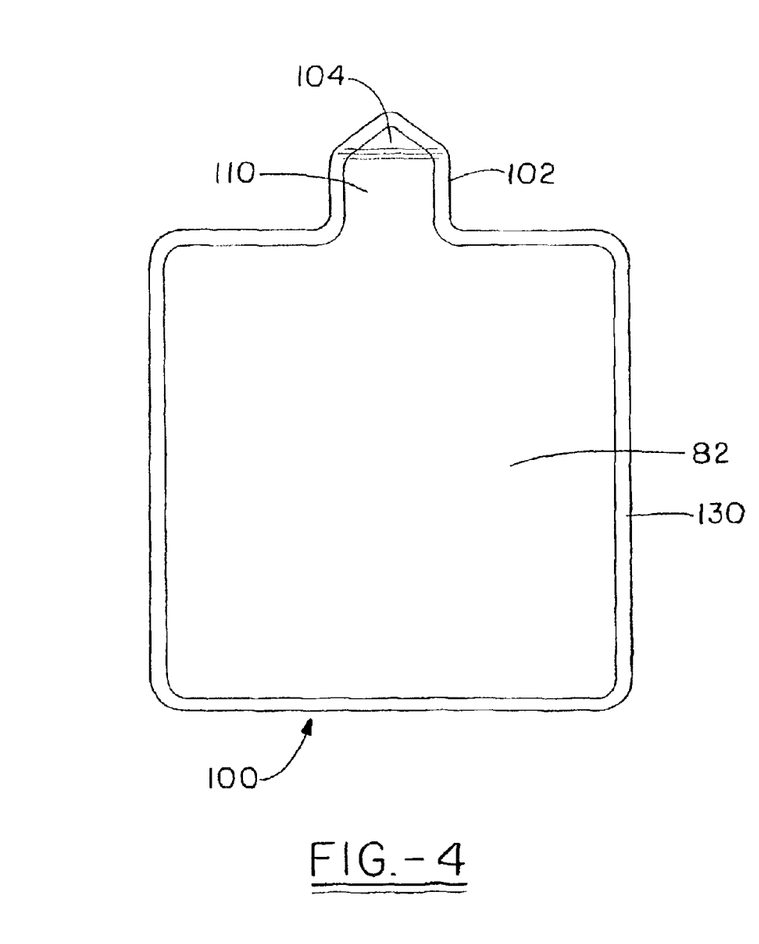
FIG. 4 is a front view of the substrate shown in FIG. 3.

In-mold coatings can be applied to a substrate in numerous ways well known to those of ordinary skill in the art. The present invention is not meant to be limited to the following example. As shown in FIG. 2, an in-mold coating or second composition injector 60 has a nozzle 62 which is located on the molding apparatus in a suitable location such as on mold half 30. A first quantity of a first composition 80 is injected into a mold cavity to a desired predetermined level, forming a substrate, work piece, or article, such as plaque 100 shown in the views of FIGS. 3–5. As shown in FIG. 3, the substrate has at least a show surface 82 and a back side 84. An in-mold coating composition 90 is then injected into the mold cavity from in-mold coating injector 60. The in-mold coating is injected through at least one nozzle 62 onto the show surface side of the substrate at a location such as 104 on tab 102 as shown in FIG. 4.

It is important to note that the mold is not opened or unclamped before and/or during in-mold coating application, that is, the mold halves maintain a parting line and generally remain a substantially fixed distance from each other while both the first and second compositions are injected into the mold cavity as described herein.

The liquid in-mold coating composition spreads out, disperses, or radiates from the point of injection 104 onto the show surface of the substrate. The point of injection of the in-mold coating onto the substrate will depend on the location of the in-mold coating injector and nozzle thereof in the molding apparatus. Accordingly, the point of injection of the in-mold coating can be located substantially anywhere on the substrate show surface and is not limited to the locations shown in the drawings of the present invention. The in-mold coating cures on the substrate sometime after injection as known in the art. The cure is optionally heat activated, from sources including but not limited to the molded substrate or the mold itself.

One embodiment of the present invention relates to a method for directing or channeling the flow of an in-mold coating on a substrate. Unexpectedly, it has been found that substrate compressibility can be utilized to direct in-mold coating flow for in-mold coating systems which are conducted "closed clamp", wherein the mold halves remain abutted or closed at least during the time between injection of a first composition and an in-mold coating composition. That is, the parting line between the mold halves is not separated during the molding operation in which an in-mold coated substrate is produced. When mold halves 20, 30 are closed or joined, a mold cavity 40 is formed therebetween. The mold cavity has a configuration with a specific defined volume. A predetermined amount of a first composition which will produce a desired substrate is injected into the mold cavity. By the term predetermined, it is understood by one of ordinary skill in the art that through the control of variables of the molding process, a calculated amount of material that will produce a desired substrate can be experimentally determined. After the first composition has been injected into the mold cavity and has cooled below the melt point or otherwise reached a temperature sufficient to accept or support an in-mold coating, a predetermined amount of in-mold coating is injected from injector unit 60 through at least one nozzle onto an injection point of the substrate, preferably on a show surface thereof. The coating is injected at a pressure that ranges generally from about 500 psi (34 bar) to about 5,000 psi (345 bar), desirably from about 1,000 psi (69 bar) to about 4,500 psi (310 bar), and preferably from about 2,000 psi (138 bar) to about 4,000 psi (276 bar). The injection pressure promotes the spread of the in-mold coating away from the nozzle. The in-mold coating spreads from the nozzle between a mold surface and a surface of the substrate.

Unexpectedly, it has been found that by varying the thickness or depth of the resin of the substrate below the surface to be coated, the in-mold coating can be routed to preferred areas of the substrate, and contained therein, if desired. For example, if a mold cavity is designed so that a substrate has a constant thickness under an area to be in-mold coated, the in-mold coating will spread out from the location of injection in a substantially radial, even, or constant manner. Under the same relative conditions, if a substrate is formed having areas which vary in thickness under the surface area to be coated, the in-mold coating can be channeled to flow in area(s) of greater relative thickness. Thus, the depth of the coating can also vary on the coated surface. It has been demonstrated, as stated hereinabove, that the compressibility of the substrate allows a substrate area having a greater depth relative to a second area to compress more and better accommodate in-mold coating flow and promote migration thereof.

Figure 5:
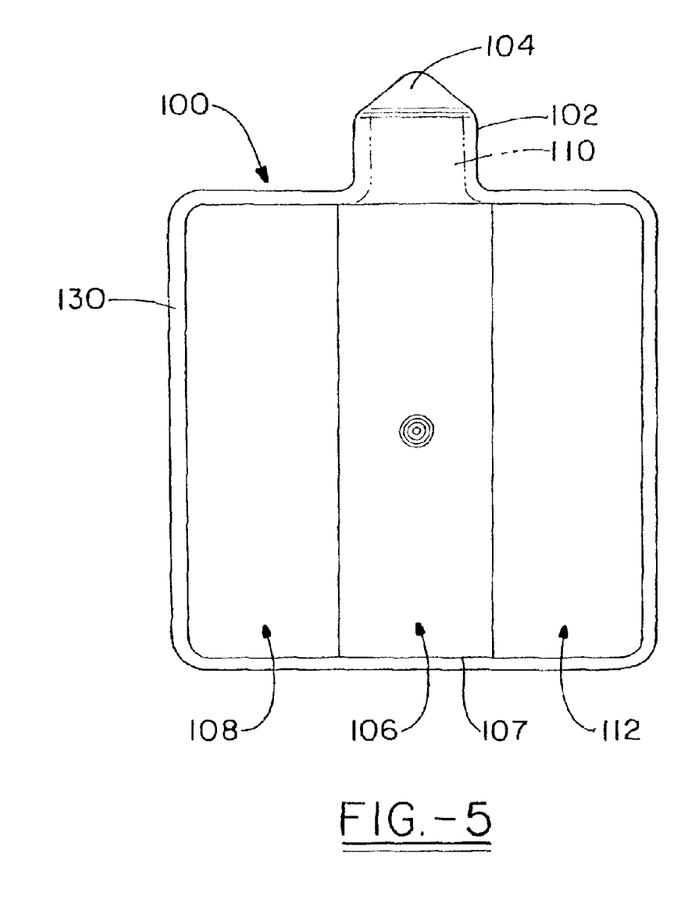
FIG. 5 is a back view of the substrate shown in FIG. 3, wherein areas of varying depth are distinctly shown.

In one embodiment of the present invention, a substrate is provided with an area or section of increased thickness around the point or location where the in-mold coating is injected onto the substrate in order to promote in-mold coating flow. By increased thickness, it is to be understood that the thickness of the substrate around the in-mold coating injection location is greater than at least one other area or section of the substrate. As shown in FIG. 5, plaque 100 is shown with a tab area 110 at a location of in-mold coating injection. The tab area thickness can be varied to enhance channeling of the in-mold coating. Tab section 104 in FIG. 4 includes a thin section or in-mold coating containment tab flange 102 which prevents the in-mold coating from flowing out of the mold cavity. The concept of the containment flange will be further explained hereinbelow. The relatively thick tab area promotes in-mold coating flow from the in-mold coating nozzle onto the show surface 80 of the substrate. The in-mold coating will tend to avoid tab or other substrate sections of minimal or lesser thickness.

Figure 6:
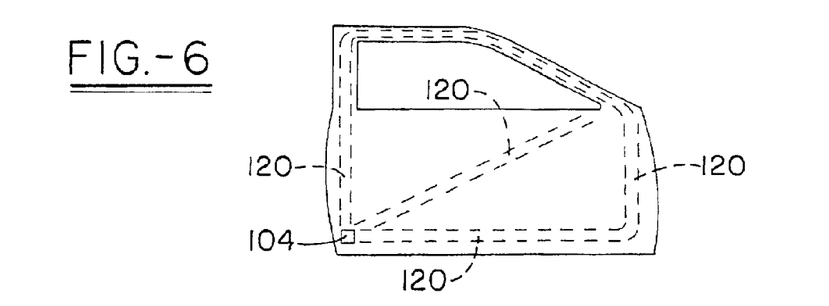
FIG. 6 is a side view of a molded door panel. The door panel is provided with areas of varying depth in order to channel in-mold coating flow over the surface so that the same is coated in desired areas in order to meet a predetermined standard.

In a further embodiment of the present invention, a substrate is provided with at least one "runner" section, preferential flow channel, or area to promote in-mold coating flow on a substrate. A runner section is an area which is relatively thicker than another area adjacent thereto, wherein the in-mold coating can be preferably routed to flow. Advantageously, runner sections can be provided on substrates of complex design or which were previously difficult to coat. A runner section generally is located in an area on the substrate beginning in the region of the point of injection of the in-mold coating and extending away therefrom to a predetermined point or terminus on the substrate. For example, FIG. 5 has a runner section 106 extending from and including the tab area to substantially the bottom end 107 of the plaque. FIG. 6 shows a door panel having three runner sections 120. By providing a substrate with at least one runner section, in-mold coatings can be effectively routed or channeled to cover desired areas of a substrate.

Depending on the amount of in-mold coating injected into the mold cavity, the show surface substrate having a runner section can be completely coated or coated only in certain areas or sections such as the runner areas. The amount of coating applied and thickness thereof can vary from part to part.

The depth of the runner section can vary depending on the substrate to be coated and design specifications. A substrate can have a runner section extending from an area of in-mold coating injection which is so relatively thick that all of the in-mold coating application to the substrate surface will substantially remain in the runner section. Therefore, as can be imagined, many unique effects can be created by utilizing runner sections. Frequently, it is desirable to completely coat the show surface with an in-mold coating. It is often difficult to coat a substrate having a complex or detailed shape. Runner sections can be used to effectively in-mold coat these substrates by channeling in-mold coating to the previously hard to coat areas. For example, a runner section can be utilized to channel a coating to a distal part of a substrate surface. The runner section thickness can be gradually decreased such as in a direction away from the point of injection as needed, or even separated or divided into more than one runner section to accomplish a desired effect or coating.

In yet another embodiment of the present invention, a molded substrate or article is provided with an in-mold coating containment flange 130. As shown in at least FIG. 4, coating containment flange preferably extends completely around the perimeter of a substrate, specifically plaque 100. Often, it is desirable to substantially coat the show surface of a substrate with an in-mold coating. The containment flange 130 acts a barrier and prevents the in-mold coating from leaking or seeping out of the mold cavity and potentially blowing out of the parting line between the mold halves.

As shown in at least FIG. 3, flange 130 is generally offset or formed in a plane below the plane of the show surface 82. Thus, the show surface has an edge or border 83 which transitions into flange 130. Show surface edge 83 drops off into a wall at an angle of about 90° relative to the show surface. Substrate wall 86 terminates at flange portion 130, wherein flange portion extends at an angle of about 90° in relation to wall 86. It is believed that the relatively sharp angles between show surface and flange 130 as well as the relative incompressibility of the thin flange act as a substantial barrier to coating flow, and thus prevent the coating from leaving the show surface. The flange generally has a thickness less than the thinnest portion or area of the substrate. As shown in FIG. 3, containment flange 130 is thinner than section 112, the relatively thinnest section of the substrate. The in-mold coating containment flange encompasses substantially the entire perimeter of a substrate surface that will be or is coated. The width may vary based on factors such as part design and wall stock dimensions. As stated above, the main purpose of the flange is to prevent the in-mold coating from leaving the target surface of the substrate and stopping the coating from gaining entrance to the mold parting line.

Figure 7:
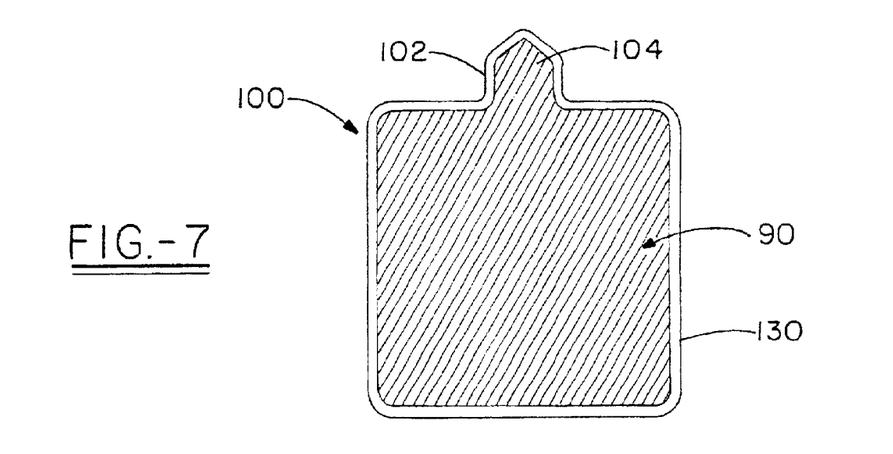
FIG. 7 is the substrate of FIG. 4 having an in-mold coating on a show surface thereof.
Figure 8:
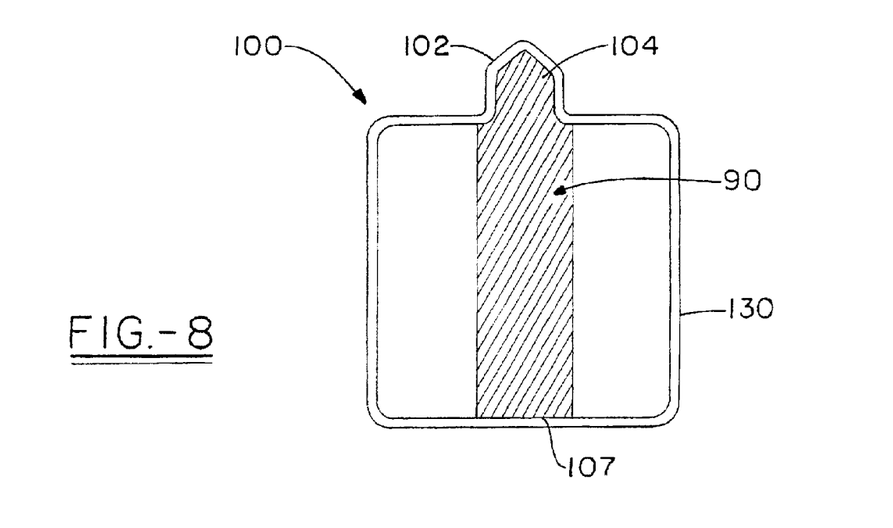
FIG. 8 is the substrate of FIG. 4 having an in-mold coating located substantially only in a runner section of the show surface.

As shown in FIG. 7, the in-mold coating 90 covers the entire show surface of the molded substrate. Due to the configuration of the molded substrate as well as other molding variables, the coating 90 does not cover or coat the containment flange 130. However, it is permissible for the in-mold coating to coat or partially coat the containment flange. Due to the design of the containment flange, generally less than about 10%, desirably less than 5%, and preferably less than 1% by weight of the in-mold coating injected in a single molding cycle covers or coats the containment flange. The containment flange is free of any other substrate material on the distal edge thereof. This is, there is no other substrate material or outer edge between the containment flange and the mold cavity parting line.

In yet another embodiment of the present invention, an article with a separable, breakable, removable flash edge or containment flange is disclosed. Molded articles, parts, or substrates are most often constructed to conform to certain predetermined, definite tolerances. Frequently, the articles are designed to fit exactly or substantially exactly into an assembly or working arrangement of parts. Articles provided with an additional containment flange to contain a coating are often larger than specified manufacturing tolerances. Furthermore, often the containment flange show surface is not coated with an in-mold coating, leaving the article with an undesirable appearance.

In most cases it is preferable to coat the entire show surface, i.e. usually one side, of an article with a paint or in-mold coating so that the substrate show surface is at least 80%, 90%, 95%, 99%, and preferably fully (100%) coated. While it is known in the art to coat an article surface with an in-mold coating, there is difficultly in keeping the uncured in-mold coating confined to the intended substrate target surface area. Frequently, the in-mold coating will flow, seep, or leak onto surrounding mold surfaces, such as around the parting line; the unintended back surfaces of the article which is not to be coated; and even out of the mold halves and mold itself. Another problem associated with coating leakage or seeping is that the coating may not become properly packed in the mold resulting in coated parts having dull, non glossy appearances, parts not having an even film build or adequate coating thickness, or parts not exhibiting the desired or required texture. Coating seepage onto ejector pins can cause binding and unworkability of the molding apparatus. The described overflow is unacceptable as parts or articles can be ruined, and mold surfaces must be cleaned to remove coating buildup, costing both time and monetary expense.

The present invention prevents the aforementioned problems by providing an article having an in-mold coating containment flange or flash edge which is flexible and thus easily removable, e.g. by hand after the article has been coated and the coating cured. The coated article with the removable containment edge removed can be used "as is", such as in an assembly. One advantage of the removable containment flange is that an article having the flange, which may only be partly coated and possibly unsightly, can be easily removed and discarded. Moreover, a fully coated part of desired dimensions and exact standards can be produced. Labor and monetary savings are other advantages as coating containment is achieved, and waste is minimized. The removable containment flange potentially eliminates part painting operations, secondary handling, and shipping costs between a part molder and a painter. Often up to 75% of a part cost is in the painting thereof. The in-mold coated part with a removable containment flange alleviates these problems.

Figures 11, 12, 13A, 13B, 13C, 13D:
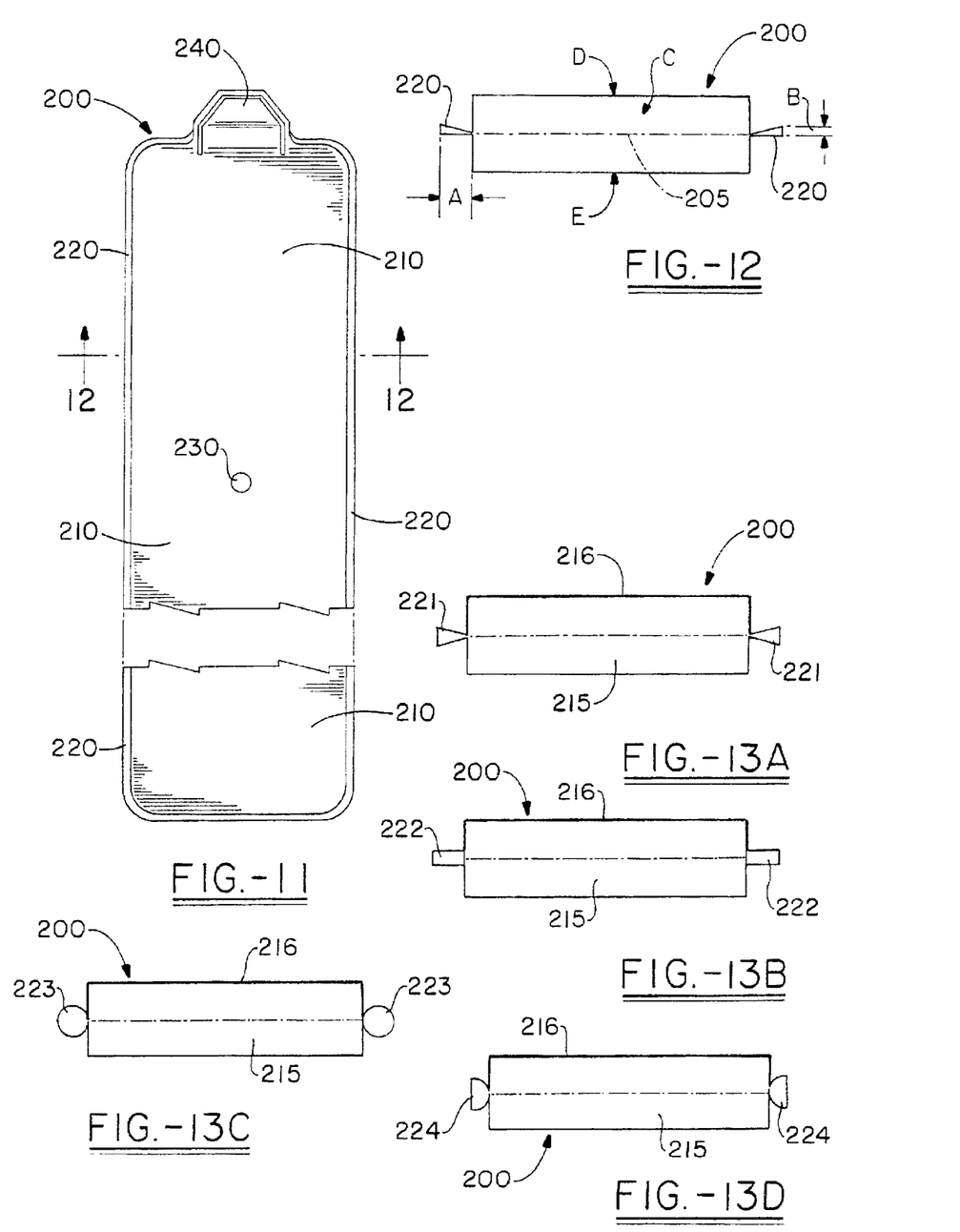
FIG. 11 is a plan view of a substrate having a removable, flexible, in-mold coating containment flange.
FIG. 12 is a cross section of FIG. 11 through 12—12 illustrating a preferred embodiment of a removable in-mold coating containment flange.
FIGS. 13A through 13D are cross sectional illustrations of molded substrates having removable in-mold coating containment flanges of various configurations.

A molded article or substrate having a removable flexible in-mold coating containment flange is shown in FIG. 11 and designated 200. The substrate main or show surface 210 has an in-mold coating thereon. Due to the presence of the removable in-mold coating containment flange 220, the in-mold coating applied to the substrate is prevented from leaving the surface of the substrate and contaminating other mold surfaces or the back side of the molded article. FIG. 11 also illustrates substrate injection area 230 wherein the substrate was injected into the mold. In-mold coating injection area 240 shows the ingress area or point of origination of the in-mold coating which has spread across the show surface of the substrate therefrom.

Figures 14, 15A:
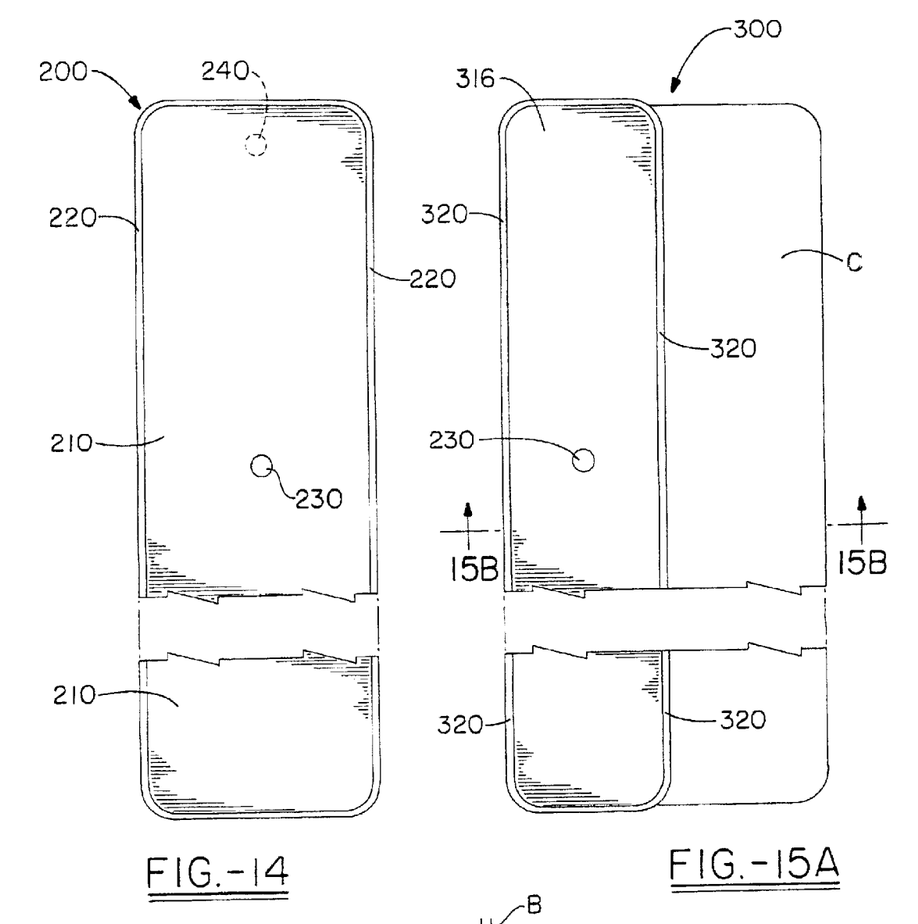
FIG. 14 is a plan view of a substrate having a removable, in-mold coating containment flange extending completely around the perimeter of the substrate show surface.
FIG. 15A is a plan view of a substrate having a removable in-mold coating containment flange on the show surface of as well as on the perimeter in order to contain the in-mold coating to a predetermined area of the show surface.

As also shown in FIG. 11, the removable flange preferably extends completely around the periphery of the substrate main surface in order to contain the in-mold coating flow from leaving the main surface, with exception to the area around the in-mold coating injection area 240 which already includes a feature for in-mold coating containment. The removable flange of the present invention generally extends at least 50% or 75% around the periphery of the substrate main surface, desirably at least 85% or 90%, and preferably substantially completely or completely around the periphery of the substrate main surface. FIG. 14 shows a removable flange 220 extending completely around the periphery of the main surface of a substrate 200. In-mold coating injection inlet area 240 is also shown. The removable flange will extend less than the complete distance around the perimeter or periphery of the substrate main portion if some other in-mold coating containment feature is present or substantially no in-mold coating leakage or seeping occurs in the specific area.

The removable confinement or containment flange is located or formed on a substrate surface in an area or plane between the show surface edge or perimeter, i.e. surface to be coated, and a backside edge or perimeter of the part. No matter which embodiment or design of flange is utilized, each flange has a width and a depth or height. As shown in FIG. 12, the width A can be defined as the greatest distance the flange extends outward, or away from the substrate main body C at a location between a show surface D to be coated and the non-show surface E opposite therefrom. Depth B can be considered a depth or thickness measurement, which can vary along the width of the flange, with the greatest depth generally existing at the outermost portion of the flange. An important aspect of the present invention is that the flange has a very thin section located adjacent to, or in the vicinity of, the substrate which is readily breakable.

The removable flange can have numerous configurations, all of which can be easily removed by hand. Removing the confinement or containment edge is as simple as for example, removing a piece of a model from a model kit parts card wherein the flange only needs to be bent or flexed back and forth to break the leading edge thereof away from the edge of the part main surface. FIG. 12 shows a configuration having a cross section through FIG. 11 wherein the flange 220 formed as a wedge having a depth greater at its outer end portion than where the same contacts and removably connects to the substrate main body. In this embodiment, the removable containment flange is formed only on one side of the parting line 205. The angle between the vertical side surface of the substrate main body and the containment flange top surface can vary from about 10° to about 90°, and is preferably from about 15° to about 30°. FIG. 13A shows a cross section of a coated substrate 220 with in-mold coating 216 on substrate 215 and triangular flange 221. A rectangular flange 222 is shown in the configuration of FIG. 13B. Circular and semicircular flanges can also be utilized as shown in FIGS. 13C and 13D respectively. The flange can be almost any geometric shape or design such as an ellipse, teardrop, or taper, etc.

In order that the flange of the present invention is easily removable, the point of attachment of the flange to the substrate main portion should be sufficiently thin to be easily separated or broken away therefrom. The thickness of the flange is dependent on the substrate composition being molded. Accordingly, the thickness of the flange at the point of attachment immediately adjacent to the substrate is less than about 0.70 mm, 0.60 mm or 0.50 mm, and ranges generally from about 0.25 mm to about 0.50 mm, desirably from about 0.075 mm to about 0.45 mm, and preferably from about 0.10 mm to about 0.40 mm. As shown in the drawings, the thickness of the flange in a direction away from the point of attachment to the substrate main portion can increase to any desirable thickness, which is generally greater than the thickness at the point of attachment. The thickness should be suitable so that the removable containment flange can be grasped in order to bend or flex the same for removal thereof. The width of the flange from the substrate main portion to the peripheral edge of the removable containment flange is generally from about 1 or about 2 mm to about 10 mm, desirably from about 2.5 mm to about 8 mm, and preferably from about 3 to about 6 mm.

The removable in-mold containment flange can be formed into either or both of the mold halves described hereinabove as by machining, milling operation, or the like as known to those of ordinary skill in the art. Typically, the flange is formed along one or both sides of parting line 205 of the mold as shown in at least FIG. 12. Due to the design of the containment flange and the substantial incompressibility of the containment flange at the thin or narrow point of attachment to the substrate main portion, the in-mold coating is predominately forced to stop at the attachment point between the substrate main body and containment flange as shown in FIGS. 13A–13D. That is, a compression gradient is formed and the in-mold coating is able to flow across the relatively thick, compressible substrate main portion, but cannot substantially flow across the relatively thin incompressible containment flange edge which is attached to the substrate main portion.

The removable in-mold coating containment flange is not limited in design to only extending around the perimeter of the show or other surface. In a further embodiment, the removable in-mold coating containment flange may extend onto a show or other surface of a substrate to prevent in-mold coating flow onto predetermined areas of the show or other surface. FIG. 15A illustrates a substrate 300 having a removable in-mold coating containment flange 320 extending across a portion of show surface D as well as around a portion of the perimeter of the substrate to contain in-mold coating 316 to a quadrant or predetermined area of show surface D.

Figure 15B:
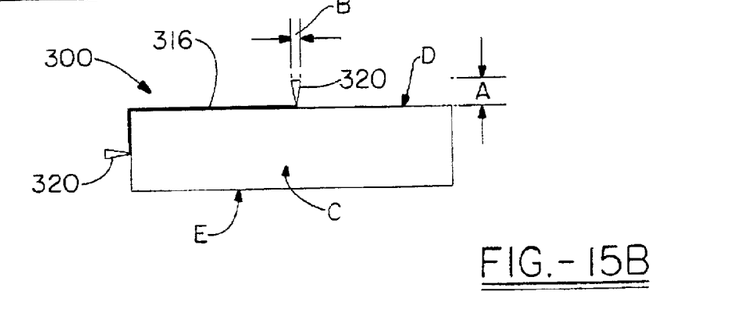
FIG. 15B is a cross sectional view of a FIG. 15A through 15A—15A.

FIG. 15B is a cross sectional view through 15B—15B of FIG. 15A. From this view it is clearly shown that in-mold coating 316 is contained in a predetermined portion of the show surface D by the removable in-mold coating containment flange 320. Accordingly, the removable in-mold coating containment flange of the present invention can be utilized in any area(s) or location(s) on any surface of a substrate to preferentially coat predetermined portions thereof. Crisply defined coating boundaries or areas on a substrate can be created when a removable containment flange is utilized on a substrate, especially a show surface thereof. Many different surface aesthetic effects can be created utilizing containment flanges, especially removable ones. Obviously, more than one, i.e. any number, of containment flanges can be utilized on an article or substrate. The containment flange can be utilized to create any type of pattern, design, logo, lettering, insignia, etc. Different colored in-mold coatings can be incorporated in different areas of a substrate which have containment flange boundaries, thus allowing for shading, contrasting colors, special effects, etc.

The removable in-mold coating containment flanges can also be used on a substrate at an edge opening adjacent to a moveable mold section such as a slide or core which are well known to those of ordinary skill in the art. The removable flange will prevent or block the in-mold coating from leaking into the moveable core area and possibly binding the same.

The removable in-mold coating containment flange can be removed easily from its attachment point to the substrate leaving a coated substrate of a desired dimension. The thermoplastic flange can be removed preferably by hand by bending or flexing the flange at the connection point to the substrate. The containment flange snaps away or disengages from the rest of the substrate leaving a crisp clean edge. Although not necessary, the containment flange can be also removed with tools such as a cutting edge, hot edge tools, water jet, buffer, sander, router or the like.

The process of the present invention utilizes in-mold coatings, many of which are available commercially. Such coatings include GenGlaze® and Stylecoat®, acrylic based appearance in-mold coatings available from Omnova Solutions Inc. of Fairlawn, Ohio, as well as others. These and other coatings are well known to the art. In-mold coating injection devices are available commercially from EMC$^2$ of Sterling Hills, Mich., and Morrell of Auburn Hills, Mich.

Suitable in-mold coatings are found in U.S. Pat. No. 5,777,053, herein incorporated by reference. The main advantage of acrylic coatings is the high degree of resistance to thermal and photoxidation and to hydrolysis, giving coatings that have superior color retention, resistance to embrittlement and exterior durability. Low-molecular weight acrylic resins having an average functionality of two to three and containing few molecules that are nonfunctional or only monofunctional, are useful in the present invention. Epoxy resins are also useful as in-mold coatings in the present invention. A principal use of epoxy resins is as a component in two-package primer coatings. One part contains the epoxy resin and the other part contains a polyfunctional amine. Amine-terminated polyamides, sometimes called amido-amines, are widely used. A preferred acrylic resin is an epoxy-based oligomer having at least two acrylate groups and at least one copolymerizable ethylenically unsaturated monomer, and at least one copolymerizable monoethylenically unsaturated compounds having a —CO—, group and a —NH$_2$—, NH, and or —OH— group.

The present invention also contemplates the use of other resin coatings, such as alkyds, polyesters, urethane systems, amino resins, phenolic resins, and silicone resins. See e.g., Kirk Othmer, Encyclopedia of Chemical Technology, Vol. 6 (4$^{th}$ ed. 1993) at pp. 676–690.

In-mold coatings comprising five components, namely 1) a saturated aliphatic polyester intermediate urethane
2) an aliphatic polyether
3) an aliphatic or cycloaliphatic portion (meth)acrylate
4) hydroxy alkyl (meth)acrylates
5) vinyl substituted aromatics have been found to have particular utility in the practice of this invention. In-mold coating compositions are prepared as follows. The polyester urethane acrylate is mixed with the vinyl substituted aromatic monomers such as styrene, the saturated aliphatic or cycloaliphatic (meth) acrylates such as isobornyl acrylate, and the hydroxyalkyl methacrylate, such as hydroxypropyl methacrylate. After these compounds are mixed, fillers and additives, such as cure inhibitors, light stabilizers, lubricants, etc., are added and mixed. The free radical generating initiator is added last. The polyacrylate ester of a polyol can be present in the polyester urethane acrylate from the supplier. This in-mold coating composition is clear after curing.

Any of the coatings contemplated for use in the present invention can be colored by utilizing a pigment, a colorant, etc., in a desired or effective amount to yield a desired color, tint, hue, or opacity. Pigments, pigment dispersions, colorants, etc. are well known to the art and include, for example, graphite, titanium dioxide, carbon black, phthalocyanine blue, phthalocyanine red, chromium and ferric oxides, aluminum or other metal flake, and the like.

When an in-mold coating having a specific color is desired, one or more pigments, colorants, etc., can be utilized in suitable amounts. As known to the art, often times various pigments or colorants are added with a carrier, for example, a polyester, so that they can be easily blended. Any suitable mixing vessel can be utilized, and the various components and additives mixed until the compounds are blended. Even if pigments are not contained in the blend, the mixture at this point is not clear.

All of the above-described in-mold coating compositions that may be utilized in the present invention may contain other additives and fillers, etc., in amounts known to the art. For example, various cure inhibitors such as benzoquinone, hydroquinone, methoxyhydroquinone, p-t-butylcatechol, and the like, can also be utilized. Other additives may include an accelerator, such as cobalt octoate. Other classes of accelerators include zinc, or other metal carboxylates. Various light stabilizers can also be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers, such as talc, can be utilized. Other additives include hardeners, thixotropes, such as silica, and adhesion agents, such as polyvinyl acetate.

EXAMPLES

Example 1

Figure 9:
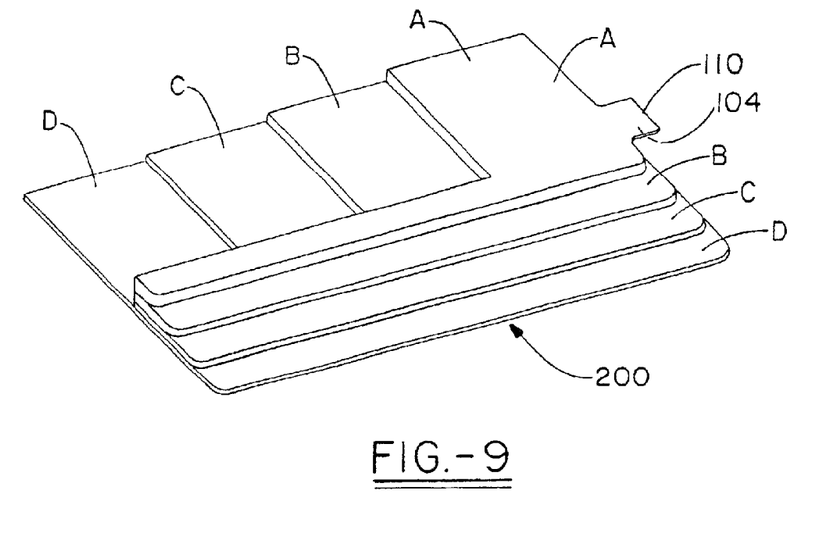
FIG. 9 is a front elevation view of a substantially flat molded plaque with a substantially flat show surface. The location of runner sections and thickness are shown for the benefit of the viewer.

A mold used to produce the plaque 200 shown in FIG. 9 was made. The mold cavity width is 12.0 inches. The mold cavity length is 20.5 inches. The mold has a hydraulic mold gate located in the center of the cavity for injection of a substrate. The mold has a tapered tab for the introduction of the IMC onto the part surface. The tab is located at the edge portion of the mold. The tab and Section A have thicknesses of 0.120 mils. Section B is 0.100 mils thick. Section C is 0.080 mils thick. Section D is 0.060 mils thick. As shown in FIG. 9, the plaque has four panels in a horizontal plane on the left side of the part and four panels in a vertical plane on the right side of the part. The panels on the horizontal plane on the right side of the part measure 6.0 inches long and 5.125 wide. The panels on the vertical plane measure 1.50 inches wide and 20.5 inches long. The plaque does not have an in-mold coating containment flange. The mold was placed in an 850 ton Cincinnati Milacron Vista injection molding machine. ABS resin heated to a temperature of 480° F. was injected into the mold cavity thus producing the part shown in FIG. 9 having sections with the above-described dimensions. FIG. 9 is a front view of the plaque. As stated above, the various sections A–D represent varying thicknesses of the plaque in the defined areas. The front of the plaque shown in FIG. 9 is a smooth surface and thus, the backside of the plaque shows the various thickness contour variations. After a hold time of approximately 120 seconds, an in-mold coating, Stylecoat® was injected through the tab portion of the plaque onto the front surface of the plaque. The chart below details how the in-mold coating flowed onto the different sections of the plaque.

| Amount of IMC | % of Full IMC Shot | Section A % Fill/mils* | Section B % Fill/mils* | Section C % Fill/mils* | Section D % Fill/mils* |
|---|---|---|---|---|---|
| .32 cubic inches | 25 | 75/1 | 15/.5 | 0/0 | 0/0 |
| .64 cubic inches | 50 | 98/3 | 85/1.6 | 10/.6 | 0/0 |

*1 mil = 0.001 inch

It was determined from the part surface area to be coated, and the desired coating thickness, that an in-mold coating amount of 1.2 cubic inches would produce a full in-mold coating shot and cover the entire plaque. As can be seen from the chart, upon in-mold coating injection onto the plaque surface, the top left panel and the inside vertical panel (runner section A) were preferentially coated when 25% of a full shot was utilized. Thus, this example shows that Section A is an effective runner section whereby the coating prefers to flow down the plaque along Section A and out to the side thereof before flowing into thinner sections B, C, and D. When 50% of a full in-mold coating shot was utilized, the in-mold coating began to flow from Section A and B into Section C. It is important to note that the plaque shown in FIG. 9 does not contain an in-mold coating containment flange. When coating levels above 50% of a full shot were utilized, the same leaked or seeped out of the mold cavity through the parting line. Thus, the need is clearly shown for an in-mold coating containment flange in order to keep the in-mold coating on the desired substrate surface. It has further been shown by the example that preferential coating of preferred or runner sections of a plaque can be obtained by utilizing the thickness of the wallstock to guide the in-mold coating across the part surface.

Example 2

Figure 10:
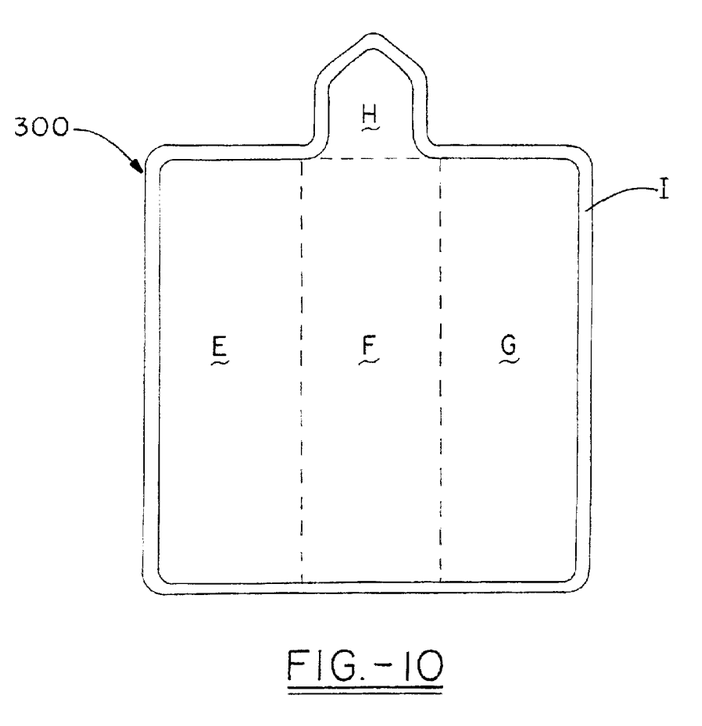
FIG. 10 is a front view of a molded substrate with areas of varying thickness illustrated.

FIG. 10 shows a thermoplastic article with a variety of substrate (thermoplastic) thicknesses. It was shown through experimentation that in-mold coating flow is influenced by the substrate thickness. The example parts were generated using a 50-ton injection molding machine, a 6-inch square steel mold cavity fitted with an IMC injection nozzle. The substrate material was a PET thermoplastic and the in-mold coating was OMNOVA's Stylecoat® IMC. The mold temperature was 250° F. with a 30 second delay time prior to IMC injection.

In FIG. 10, sections E, F, and G are representations of varying part thickness as shown by the chart below. Section H represents the in-mold coating tab design utilizing a thicker middle section which facilitates an in-mold coating flow channel at the in-mold coating nozzle tip site. Section I represents the thin sectioned containment flange.

The overall objective in designing a mold with thin and thick sections is to preferential channel the in-mold coating flow path in a desirable fashion. This can be manifested in several ways which include:

1. A channeling of the in-mold coating flow at the in-mold coating tab site (Section H) which preferentially deposits the in-mold coating inside the mold parting line onto the surface of the part.

2. A channeling of the in-mold coating flow in the part to more critical areas to fill since selective in-mold coating may be necessary in certain article designs (Sections E, F, and G).

3. A restriction of in-mold coating flow along the periphery of the mold to contain the in-mold coating on the surface of the part and within the parting line (Section I).

The observed in-mold coating coverage for the 6×6 mold is as follows:

| % of full IMC Shot | Section E % Fill/mils* | Section F % Fill/mils* | Section G % Fill/mils* | Section H % Fill/mils* | Section I % Fill/mils* |
|---|---|---|---|---|---|
| 50 | 100/3 | 80/2 | 20/1 | 100/2 | 0/0 |
| 80 | 100/4 | 100/3 | 40/2 | 100/3 | 0/0 |
| 100 | 100/4 | 100/3 | 100/3 | 100/4 | 0/0 |

Note:
Section E = 115 mils (thickness)
Section F = 85 mils
Section G = 60 mils
Section H = in-mold coating tab - 60 mils
Section I = containment flange - 25 mils
*1 mil = 0.001 inch In the example(s) we have shown that this preferential flow mechanism has advantages which include:

1. Preferential IMC flow and deposition to selected regions on a part as a result of varying thickness.

2. Achieving the containment of IMC on the part surface within the parting line resulting from a designed thin sectioned, IMC flow restricting, "containment flange."

Example 3

Removable In-Mold Coating Containment Flange

The following example illustrates in-mold coating containment on a desired surface of a molded substrate when a removable in-mold coating containment flange is utilized. Two molds were created, with the molds being identical except for one of the molds was fabricated to have a removable in-mold coating containment flange. The molds were formed as a plaque similar to that shown in FIG. 11 and cross section in FIG. 12. The flangeless plaque had a length of 19.5 inches (495.3 mm), a width of 4.75 inches (120.65 mm) and a depth of 0.100 inches (2.54 mm). The second identical plaque mold further included a removable containment flange having a width of 0.125 inches (3.175 mm) around the entire perimeter of the plaque except for the tab portion of the main surface where the in-mold coating was injected, and was connected to the plaque main surface between a show surface and a back surface as shown in FIG. 12. The tab area of the main surface of both molds had a length of 2 inches (50.8 mm) extending from a 2.25 inches (57.15 mm) width attached to the plaque main portion tapered to 1.25 inches (31.75 mm) at the other end of the tab. The connection point between the plaque and the removable containment flange had a thickness or depth of 0.005 inches (0.127 mm). The removable flange was tapered from the attachment point as shown in FIG. 12 out to a thickness of 0.015 inches (0.381 mm) to form a triangle having a right angle. The angle of the containment flange at the attachment point was 15 degrees and thus the angle between the containment flange and the vertical surface (as shown in FIG. 12) of the plaque main portion was 75 degrees.

The plaques of this example were molded on a Toshiba 950 injection molder with barrel temperature zones set from 530° F. to 560° F. utilizing Ticona PA 6/6 Nylon and XZ-31 Black Stylecoat® available from OMNOVA Solutions Inc. The mold halves were heated to 278° F. 18.85 grams of in-mold coating were injected into the mold at the tab portion of the substrate show surface.

| Mold Without Removable Containment Flange | | | | |
|---|---|---|---|---|
| | Percent Leakage | | | |
| Clamp Tonnage | Part #1 | Part #2 | Part # | Average |
| 1 Ton/Sq. In. | 74 | 68 | 79 | 79%** |
| 2 Ton/Sq. In. | 73 | 68 | 73 | 73%** |
| 3 Ton/Sq. In. | 50 | 60 | 55 | 55%** |
| 4 Ton/Sq. In. | 53 | 50 | 58 | 58%** |
| 5 Ton/Sq. In. | 68 | 68 | 73 | 73%** |
| 6 Ton/Sq. In. | 58 | 58 | 63 | 63%** |
| 7 Ton/Sq. In. | 63 | 58 | 63 | 63%** |
| 8 Ton/Sq. In. | 52 | 63 | 63 | 63%** |
| 9 Ton/Sq. In. | 58 | 57 | 52 | 52%** |
| 9½ Ton/Sq. In. | 63 | 63 | 63 | 63%** |

| Mold With Removable Containment Flange | | | | |
|---|---|---|---|---|
| | Percent Leakage | | | |
| Clamp Tonnage | Part #1 | Part #2 | Part # | Average |
| 1 Ton/Sq. In. | 20 | 20 | 20 | 20%* |
| 2 Ton/Sq. In. | 15 | 15 | 15 | 15%* |
| 3 Ton/Sq. In. | 7 | 7 | 7 | 7%* |
| 4 Ton/Sq. In. | 5 | 5 | 5 | 5%* |
| 5 Ton/Sq. In. | 0 | 0 | 0 | 0% |
| 6 Ton/Sq. In. | 0 | 0 | 0 | 0% |
| 7 Ton/Sq. In. | 0 | 0 | 0 | 0% |
| 8 Ton/Sq. In. | 0 | 0 | 0 | 0% |
| 9 Ton/Sq. In. | 0 | 0 | 0 | 0% |
| 9½ Ton/Sq. In. | 0 | 0 | 0 | 0% |

*Denotes leakage at tab, not at the parting line.
**Denotes leakage at parting line and out the vent channels on the mold.

As can be seen from the above chart, the mold without the removable containment flange allowed the in-mold coating to leak off the surface of the molded plaque no matter what clamp tonnage was applied to keep the mold halves together. The mold with the removable containment flange exhibited little or no in-mold coating leakage off the plaque show surface. Only when low amounts, i.e. four tons per square inch or less of pressure were utilized to keep the mold halves together, did a small amount of coating leak off the intended surface. It is important to note that it is believed that the in-mold coating leakage occurred at the tab because the tab portion was not surrounded with the removable containment flange in that area.

In accordance with the patent statutes, the best mode and preferred embodiment have been set forth, the scope of the invention is not limited thereto, but rather by the scope of the attached claims.

What is claimed is:

1. An in-mold coated substrate having a removable flange for in-mold coating containment, comprising:
    a molded thermoplastic substrate having a main portion including a show surface and a second surface substantially opposite said show surface, said substrate having a cured in-mold coating on at least a portion of said show surface, said substrate including a flange preventing the in-mold coating before curing from flowing off of the show surface or said flange, said flange extending at least 50% of the distance around the perimeter of said substrate main portion in a plane offset from said show surface, said flange having a width and a depth, said flange being flexibly removable from said substrate.

2. A substrate according to claim 1, wherein said flange has a depth of less than about 0.70 mm at the point of attachment to said substrate main portion.

3. A substrate according to claim 1, wherein said flange has a depth less than about 0.50 mm at the point of attachment to said substrate main portion.

4. A substrate according to claim 2, wherein said flange has a greater depth at an outer end than where said flange is removably connected to said substrate main portion.

5. A substrate according to claim 1, wherein a profile of said flange is formed as a wedge, a triangle, or a semicircle, and wherein said flange extends around at least 85% of said perimeter of said substrate main portion.

6. A substrate according to claim 5, where said flange is formed as a wedge.

7. A substrate according to claim 3, wherein said flange has a depth of about 0.05 mm to about 0.50 mm at the point of attachment to said substrate main portion.

8. A substrate according to claim 7, wherein said flange is formed in the shape of a tapered wedge, a triangle, a rectangle, a circle, or a semicircle, and wherein said flange extends around at least 90% of said perimeter of said substrate main portion.

9. A substrate according to claim 8, wherein the width of said flange from the attachment point to the substrate main portion to an outer edge thereof is from about 1 to about 10 mm.

10. A substrate according to claim 9, wherein the width of said flange from the attachment point to the substrate main portion to an outer edge thereof is from about 2.5 to about 10 mm.

11. An injection molded thermoplastic substrate; comprising:
    said substrate; and
    an in-mold coating confinement flange, said confinement flange substantially extending around the periphery of said substrate,
    said flange having a thin section adjacent to said thermoplastic substrate so that said flange is readily breakable from said substrate.

12. A substrate according to claim 11, wherein said flange has a thickness of less than about 0.70 mm at the point of attachment to said substrate main portion.

13. A substrate according to claim 11, wherein said flange has a thickness less than about 0.50 mm at the point of attachment to said substrate main portion.

14. A substrate according to claim 12, wherein said flange has a greater thickness at an outer end than where said flange is removably connected to said substrate main portion.

15. A substrate according to claim 11, wherein said flange is formed as wedge, a triangle, or a semicircle, and wherein said flange extends around at least 85% of said perimeter of said substrate main portion.

16. A substrate according to claim 15, wherein said flange is formed as a wedge.

17. A substrate according to claim 13, wherein said flange has a thickness of about 0.05 mm to about 0.50 mm at the point of attachment to said substrate main portion.

18. A substrate according to claim 17, wherein said flange is formed in the shape of a tapered wedge, a triangle, a rectangle, a circle, or a semicircle, and wherein said flange extends around at least 90% of said perimeter of said substrate main portion.

19. A substrate according to claim 18, wherein the width of said flange from the attachment point to the substrate main portion to an outer edge thereof is from about 1 to about 10 mm.

20. A method for molding and in-mold coating a substrate having a removable in-mold coating containment flange, comprising the steps of:
    introducing a substrate composition above a melting point into a mold cavity thereby forming said substrate having a main body and a flexibly removable in-mold coating containment flange, forming a perimeter extending completely around a predetermined area of said substrate main body, and
    injecting said in-mold coating into said mold cavity onto a show surface of said substrate, wherein said in-mold coating is confined to said substrate show surface by said in-mold coating containment flange.

21. An in-mold coated substrate having removable flange for in-mold coating containment, comprising:
    a molded thermoplastic substrate having a main surface, a back surface, and at least one area of thickness therebetween, said substrate including at least one removable in-mold coating containment flange for containment of an in-mold coating, said flange forming a continuous boundary around a portion of said substrate; and
    said in-mold coating located on said substrate within said boundary formed by said removable flange.

22. A substrate according to claim 21, wherein said flange has a width and a depth, and wherein said flange has a depth of less than about 0.70 mm at the point of attachment to said substrate.

23. A substrate according to claim 22, wherein said flange has a depth less than about 0.50 mm at the point of attachment to said substrate.

24. A substrate according to claim 22, wherein said flange has a greater depth at a distal end thereof than where said flange is removably connected to said substrate.

25. A substrate according to claim 21, wherein said flange is formed as a wedge, a triangle, or a semi-circle.

26. A substrate according to claim 23, wherein said flange has a depth of about 0.05 mm to about 0.50 mm at the point of attachment to said substrate main portion.

27. A substrate according to claim 26, wherein the width of said flange from the attachment point at the substrate to an outer edge thereof is from about 2.5 to about 10 mm.

28. A substrate according to claim 21, wherein said flange forms said boundary around a moveable mold section to block the flow of in-mold coating thereto.

29. A substrate according to claim 25, wherein said flange forms said boundary around a moveable mold section to block the flow of in-mold coating thereto.

30. A method according to claim 20, wherein said mold cavity is defined by at least two mold members and said at least two mold members remain a substantially fixed distance relative to one another during said steps of introducing said substrate composition to form said substrate and injecting said in-mold coating into said mold cavity.

31. A method according to claim 20, wherein said mold cavity has a volume that remains substantially constant throughout said steps of introducing said substrate composition to form said substrate and injecting said in-mold coating into said mold cavity.

32. A method according to claim 20, wherein said mold cavity is defined by at least two mold members and said mold members are not opened or unclampled and generally maintain a parting line during and between said steps of introducing said substrate composition to form said substrate and injecting said in-mold coating into said mold cavity.

* * * * *